United States Patent [19]
Martin et al.

[11] Patent Number: 5,713,423
[45] Date of Patent: Feb. 3, 1998

[54] DRILL PIPE

[75] Inventors: J. Scott Martin, Perry; Brent G. Stephenson, Oklahoma City, both of Okla.

[73] Assignee: The Charles Machine Works, Inc., Perry, Okla.

[21] Appl. No.: 834,153

[22] Filed: Apr. 14, 1997

Related U.S. Application Data

[63] Continuation of Ser. No. 442,584, May 17, 1995, abandoned, which is a continuation of Ser. No. 171,410, Dec. 22, 1993, abandoned, which is a continuation-in-part of Ser. No. 918,049, Jul. 24, 1992, abandoned.

[51] Int. Cl.$^6$ .......................... E21B 17/02; B62D 17/18
[52] U.S. Cl. .................. 175/62; 175/215; 175/320; 166/242.3
[58] Field of Search .................. 175/57, 215, 320, 175/73, 65; 166/242, 901; 138/113, 114

[56] References Cited

U.S. PATENT DOCUMENTS

| | | | |
|---|---|---|---|
| 1,746,132 | 2/1930 | Stokes. | |
| 1,831,209 | 11/1931 | Thornley et al. | |
| 2,258,001 | 10/1941 | Chamberlain. | |
| 2,402,003 | 6/1946 | Zublin | 138/64 |
| 2,778,603 | 1/1957 | McCune et al. | |
| 2,958,512 | 11/1960 | Humphrey. | |
| 3,047,313 | 10/1962 | Bruce | 285/47 |
| 3,061,024 | 10/1962 | Thompson | 175/103 |
| 3,446,297 | 5/1969 | Cullen et al. | 175/301 |
| 3,471,177 | 10/1969 | Garrett et al. | 175/215 X |
| 3,578,029 | 5/1971 | Cullen et al. | 138/133 |
| 3,664,441 | 5/1972 | Carey | 175/215 X |
| 3,786,878 | 1/1974 | Chapman | 175/320 |
| 3,791,415 | 2/1974 | Lawless et al. | 138/127 |
| 3,799,440 | 3/1974 | Goss et al. | 239/120 |
| 3,830,319 | 8/1974 | van der Wijden | 175/215 |
| 3,831,635 | 8/1974 | Burton | 138/114 |
| 3,873,156 | 3/1975 | Jacoby | 299/4 |
| 3,926,265 | 12/1975 | Bouyoucos | 173/80 |
| 3,974,862 | 8/1976 | Fuhrmann | 138/37 |
| 3,998,479 | 12/1976 | Bishop | 285/133.2 |
| 4,012,061 | 3/1977 | Olson | 285/133 A |
| 4,067,596 | 1/1978 | Kellner et al. | 175/215 X |
| 4,094,536 | 6/1978 | Cole et al. | 285/21 |
| 4,248,261 | 2/1981 | Carlson | 137/590 |
| 4,274,549 | 6/1981 | Germain | 138/113 X |
| 4,299,510 | 11/1981 | Emmerich et al. | 403/282 |
| 4,337,563 | 7/1982 | Becker et al. | 175/215 X |
| 4,385,668 | 5/1983 | Becker et al. | 175/215 X |
| 4,462,472 | 7/1984 | Beimgraben | 175/320 |
| 4,691,790 | 9/1987 | Reichman et al. | 175/215 X |
| 4,850,440 | 7/1989 | Smet | 175/67 |
| 4,872,519 | 10/1989 | Kopecki | 175/320 |
| 4,880,067 | 11/1989 | Jelsma | 175/107 |

(List continued on next page.)

FOREIGN PATENT DOCUMENTS

| | | |
|---|---|---|
| 0532324 | 9/1992 | European Pat. Off.. |
| 2654150 | 11/1975 | Germany. |
| 3239342 | 10/1982 | Germany. |
| 8604950 | 8/1986 | WIPO. |

*Primary Examiner*—Frank Tsay
*Attorney, Agent, or Firm*—McKinney, Stringer & Webster, P.C.

[57] ABSTRACT

A drill pipe (10, 100, 220, 200, 210, 250) is disclosed which includes a cylindrical pipe section (12), a box end (14), a pin end (16) and a hydraulic hose assembly (202, 18) or tube (212, 90, 260) inserted between the box and pin ends and extending within the cylindrical pipe section. All, or the majority of drilling fluid passes through the hydraulic hose assembly (202, 18) or tube (212, 90, 260). The interior surface of the cylindrical pipe section (12) may or may not be exposed to the drilling fluid but any corrosion generated by metal-to-fluid contact is generally trapped between the hose or tube and the pipe section. The reduced volume of the hydraulic hose assembly (202, 18) or tube (212, 90, 260) relative to conveying the drilling fluid through the interior of the cylindrical pipe section reduces significantly the waste of drilling fluid, allows the fluid to be pressurized more rapidly to initiate drilling operation, and limits fluid spill damage to the environment.

58 Claims, 8 Drawing Sheets

U.S. PATENT DOCUMENTS

| | | | |
|---|---|---|---|
| 4,921,057 | 5/1990 | Smet | 175/203 |
| 4,934,466 | 6/1990 | Paveliev et al. | 175/102 |
| 4,949,797 | 8/1990 | Isom | 175/317 |
| 5,005,613 | 4/1991 | Stanley | 141/45 |
| 5,007,487 | 4/1991 | Dahle et al. | 175/57 |
| 5,101,918 | 4/1992 | Smet | 175/424 |
| 5,174,395 | 12/1992 | Potvin | 175/320 |

DRILL PIPE

CROSS REFERENCE TO RELATED APPLICATIONS

This application is a continuation of U.S. application Ser. No. 08/442,584, filed May 17, 1995, entitled "DRILL PIPE", now abandoned, which is a continuation of U.S. application Ser. No. 08/171,410 filed Dec. 22, 1993, entitled "DRILL PIPE", now abandoned, which is a continuation-in-part of U.S. application Ser. No. 07/918,049, entitled "DRILL PIPE", filed Jul. 24, 1992, now abandoned, which prior applications are incorporated herein by reference.

BACKGROUND OF THE INVENTION

In drilling, a drill bit is typically rotated and moved forward in the borehole by a drill string made up of a number of individual drill pipes. Often, the drilling action of the bit is assisted by the flow of a drilling fluid or mud flowing through the drill pipe. The fluid is discharged at the drill bit to cool the bit and remove debris. The drilling fluid then flows out of the borehole in the annulus formed between the drill string and the wall of the borehole.

In horizontal drilling of the type used in trenchless drilling technology, fluid is typically discharged at the drill bit through a nozzle jet or jets to increase discharge velocity. Corrosion particles in the fluid tend to plug filter screens and nozzles, and reduce or block fluid flow. High quality steel drill pipe is typically coated on its inside surface to minimize the amount of corrosion and particle generation as the drilling fluid flows through the pipe. Such a coating process is expensive. The extra coating requirement adds direct manufacturing costs, handling costs, inventory costs, environmental costs and quality costs to the finished product. To date, filling the entire interior volume of the drill pipe and conveying the drilling fluid in direct contact with the drill pipe interior wall has been the only mechanism to deliver the drilling fluid to the drill bit at the cutting face. However, a need exists to improve this delivery system and reduce the total costs of the drilling operation, including the costs of drill pipe manufacturing.

SUMMARY OF THE INVENTION

The present invention is directed to a drill pipe for use in drill strings in rotary boring applications using drilling fluid. The drill pipe comprises an elongate, hollow outer member having first and second ends. A first connector member is supported at the first end of the outer member, and a second connector member is supported at the second end of the outer member. The first connector member is correlative with the second connector member of an adjacent like outer member to form successive lengths of drill pipe, and the first and second connector members are adapted to transmit drilling fluid. The drill pipe further comprises an inner member adapted to transmit drilling fluid, the inner member being positioned generally coaxially within the outer member and forming an annulus between the inner member and the outer member. The inner member is nonsealably adjoined with a connector member to permit communication of drilling fluid through the inner member and the annulus, and the inner member is isolated from the inner member of a connected, like adjacent drill pipe.

The present invention further is directed to a system of drill pipe for use in rotary boring applications using drilling fluid. The system of drill pipe comprises a plurality of drill pipe. Each drill pipe comprises an elongate, hollow outer member having first and second ends. A first connector member is supported at the first end of the outer member, and a second connector member is supported at the second end of the outer member. The first connector member is correlative with the second connector member of an adjacent like outer member to form successive lengths of drill pipe, and the first and second connector members are adapted to transmit drilling fluid. Each drill pipe further comprises an inner member adapted to transmit drilling fluid, the inner member being positioned generally coaxially within the outer member and forming an annulus between the inner member and the outer member. The inner member is nonsealably adjoined with a connector member to permit communication of drilling fluid through the inner member and the annulus, and the inner member is isolated from the inner member of a connected, like adjacent drill pipe.

The present invention further is directed to a horizontal boring machine comprising a spindle for connecting a drill string to the horizontal boring machine, the drill string comprising a plurality of drill pipe. The drill pipe comprises an elongate, hollow outer member having first and second ends. A first connector member is supported at the first end of the outer member, and a second connector member is supported at the second end of the outer member. The first connector member is correlative with the second connector member of an adjacent like outer member to form successive lengths of drill pipe, and the first and second connector members are adapted to transmit drilling fluid. Each drill pipe further comprises an inner member adapted to transmit drilling fluid, the inner member being positioned generally coaxially within the outer member and forming an annulus between the inner member and the outer member. The inner member is nonsealably adjoined with a connector member to permit communication of drilling fluid through the inner member and the annulus, and the inner member is isolated from the inner member of a connected, like adjacent drill pipe.

Still further, the present invention is directed to a drill pipe for use in a drill string rotating a drill bit or backreaming tool and conveying a drilling fluid. The drill pipe comprises a pipe section having an interior and a first end and a second end. The drill pipe further comprises a pin end having a male threaded portion and a passage formed therethrough, the pin end secured to the first end of the pipe section, and a box end having a female threaded portion and a passage formed therethrough, the box end secured to the second end of the pipe section. A drilling fluid conveying device is positioned between the pin end and the box end and within the pipe section to convey drilling fluid through the pipe section interior but not sealed to the pin end or box end. The drilling fluid conveying device has a central passage therethrough conveying a portion of the drilling fluid, the drilling fluid conveying device having an exterior surface, an annulus formed between the exterior surface and the interior of the pipe section, the remainder of the drilling fluid flowing through the annulus. The drilling fluid conveying device includes a hose having a first end and a second end, a first hose firing fit within the first end of the hose and a second hose firing fit within the second end of the hose.

The present invention further is directed to a drill pipe for use in a drill string rotating a drill bit or backreaming tool and conveying a drilling fluid. The drill pipe comprises a pipe section having a first end and a second end, the pipe section further having an inner surface. The drill pipe further comprises a pin end having a male threaded portion and a passage formed therethrough, the pin end secured to the first end of the pipe section, and a box end having a female threaded portion and a passage formed therethrough, the box end secured to the second end of the pipe section. A drilling fluid conveying device is attached between the pin end and the box end to convey drilling fluid through the pipe section interior, the drilling fluid conveying device and pipe section deriving an enclosed volume therebetween isolated from the drilling fluid conveyed through the pipe section interior. The drilling fluid conveying device is a hydraulic hose assembly. The hydraulic hose assembly comprises a hydraulic hose and further comprises threaded hydraulic hose connectors at each end of the hydraulic hose, one of the threaded hydraulic hose connectors threadedly secured to the pin end and the other of said hydraulic hose connectors threadedly secured to the box end.

The present invention is further directed to a method of drilling wherein the drilling is performed by a drill string extending to a drill bit, the drill string formed of a plurality of drill pipes, each drill pipe having a male threaded end and a female threaded end and a passage formed therethrough for passage of drilling fluid to the drill bit, the interior of the drill pipe having a predetermined volume. The method comprises the step of attaching a first end of a hydraulic hose to the male threaded end of the drill pipe and the other end of the hydraulic hose to the female end of the drill pipe. The hose passes through the passage in the pipe section and defines an isolated chamber between the hydraulic hose and the interior of the drill pipe. The method further comprises the step of conveying the drilling fluid through the pipe section within the hydraulic hose, the interior volume of the drill pipe with the hydraulic hose being less than the predetermined volume within the drill pipe, thus consenting drilling fluid and limiting fluid spill damage to the environment.

The present invention further is directed to a method of drilling or backreaming wherein the drilling or backreaming is performed by a drill string extending to a drill bit or backreaming tool, the drill sting formed of a plurality of drill pipes, each drill pipe having a male threaded end and a female threaded end and a passage formed therethrough for passage of drilling fluid to the drill bit, the interior of the drill pipe having a predetermined volume, the drill pipe further defining an interior surface. The method comprises the step of attaching a first end of a rigid or flexible tube to the male threaded end of the drill pipe and the other end of the tube to the female threaded end of the drill pipe. The tube passes through the passage in the drill pipe and defines an enclosed volume between the tube and the interior surface of the drill pipe. The method further comprises the step of conveying the drilling fluid through the drill pipe within the tube, the interior volume of the drill pipe with the tube being less than the predetermined volume within the drill pipe, thus conserving drilling fluid, and limiting fluid spill damage to the environment.

The present invention further is directed to a drill pipe for use in a drill string rotating a drill bit or backreaming tool and conveying a drilling fluid. The drill pipe comprises a pipe section having a predetermined diameter established by the torque and force carrying requirements of the drill string to rotate, advance and steer the drill bit or the backreaming tool. The pipe section has a first end and a second end and an inner surface. The drill pipe further comprises a pin end having a male threaded portion to threadedly attach the drill pipe to an adjacent drill pipe, the pin end having a passage formed therethrough the pin end further having a female threaded portion at one end of the passage, the pin end welded to the first end of the pipe section. The drill pipe further comprises a box end having a female threaded portion for attachment to an adjacent drill pipe, the box end further having a passage formed therethrough, a female threaded portion being formed at one end of the passage, the box end welded to the second end of the pipe section. The drill pipe further comprises a hydraulic hose assembly having a first male threaded end, a second male threaded end and a flexible hydraulic hose extending between the male ends, the male ends being threadable in the female threaded portions at the passage through the pin and box ends. The interior diameter of the hydraulic hose is determined by the flow requirements for the drilling fluid. The hydraulic hose assembly has an exterior, the exterior of the hydraulic hose assembly and the inner surface of the pipe section defining an enclosed volume which is not exposed to the drilling fluid.

The present invention further is directed to a drill pipe for use in a drill string rotating a drill bit or a backreaming tool and conveying a drilling fluid. The drill pipe comprises a pipe section having a predetermined diameter established by the torque and force carrying requirements of the drill string to rotate, advance and steer the drill bit or backreaming tool. The pipe section has a first end and a second end and an inner surface. The drill pipe further comprises a pin end having a male threaded portion to threadedly attach the drill pipe to an adjacent drill pipe, the pin end having a passage formed therethrough, the pin end further having a female portion at one end of the passage, the pin end welded to the first end of the pipe section. The drill pipe further comprises a box end having a female threaded portion for attachment to an adjacent drill pipe, the box end further having a passage formed therethrough, the box end further having a female portion at one end of the passage, the box end welded to the second end of the pipe section. The drill pipe further comprises a rigid or flexible robe assembly having a tube with a first end and a second end, the ends being receivable in the female portions at the passage through the pin and box ends and sealed thereto, the interior diameter of the tube being determined by the flow requirements for the drilling fluid, the tube assembly having an exterior surface, the exterior surface of the tube assembly and the inner surface of the pipe section defining an enclosed chamber which is not exposed to the drilling fluid passing through the tube assembly.

Still further, the present invention further is directed to a drill pipe for use in a drill string rotating a drill bit or a backreaming tool and conveying a drilling fluid. The drill pipe comprises a pipe section having a predetermined diameter established by the torque and force carrying requirements of the drill string to rotate, advance and steer the drill bit or backreaming tool. The pipe section has a first end and a second end and defines an inner surface. The drill pipe further comprises a pin end having a male threaded portion to threadedly attach the drill pipe to an adjacent drill pipe, the pin end having a passage formed therethrough, the pin end further having a female portion at one end of the passage, the pin end attached to the first end of the pipe section by any combination of forging and/or machining and/or threading operations. The drill pipe further comprises a box end having a female threaded portion for attachment to an adjacent drill pipe, the box end further having a passage formed therethrough, the box end further having a female portion at one end of the passage, the box end attached to the second end of the pipe section by any combination of forging and/or machining and/or threading operations. The drill pipe further comprises a rigid or flexible tube assembly having a tube with a first end and a second end, the ends being receivable in the female portions at the passage through the pin and box ends and sealed thereto, the interior diameter of the tube being determined by the flow requirements for the drilling fluid, the tube assembly having an exterior surface, the exterior surface of the tube assembly and the inner surface of the pipe section defining an enclosed volume which is not exposed to the drilling fluid.

The present invention further is directed to a drill pipe for use in a drill string rotating a drill bit or backreaming tool and conveying a drilling fluid. The drill pipe comprises a pipe section having a first end and a second end and an interior surface, a pin end having a male threaded portion and a passage formed therethrough, the pin end secured to the first end of the pipe section, a box end having a female threaded portion and a passage formed therethrough, the box end secured to the second end of the pipe section, and a drilling fluid conveying device positioned between the pin end and the box end and having a central passage therethrough conveying a portion of the drilling fluid. The drilling fluid conveying device has an exterior surface, an annulus formed between the exterior surface and the interior surface of the pipe section, the remaining portion of the drilling fluid flowing through the annulus, the annulus sufficiently small to resist movement of rest from the interior surface of the pipe section from being carded along the annulus by the drilling fluid.

Finally, the present invention is directed to a drill pipe for use in a drill string rotating a drill bit or backreaming tool and conveying a drilling fluid. The drill pipe comprises a pipe section having an interior surface and a first end and a second end, a pin end having a male threaded portion and a passage formed therethrough, the pin end secured to the first end of the pipe section, a box end having a female threaded portion and a passage formed therethrough, the box end secured to the first end of the pipe section, and a drilling fluid conveying device positioned between the pin end and the box end within the interior of the pipe section. The drilling fluid conveying device has a central passage therethrough conveying a portion of the drilling fluid and an exterior surface, an annulus formed between the exterior surface of the drilling fluid conveying device and the interior surface of the pipe section, a sufficient quantity of the remaining portion of the drilling fluid flowing through the annulus to maintain generally equal pressure within the passage in the drilling fluid conveying device and on the exterior surface of the drilling fluid conveying device.

BRIEF DESCRIPTION OF THE DRAWINGS

For a more complete understanding of the present invention and the advantages thereof, reference is now made to the following description taken in conjunction with the accompanying drawings, in which:

FIG. 18 is a view of the pipe nipple.

DETAILED DESCRIPTION

With reference now to the accompanying figures and the following Detailed Description, a drill pipe 10 forming a first embodiment of the present invention is described.

Figure 1:
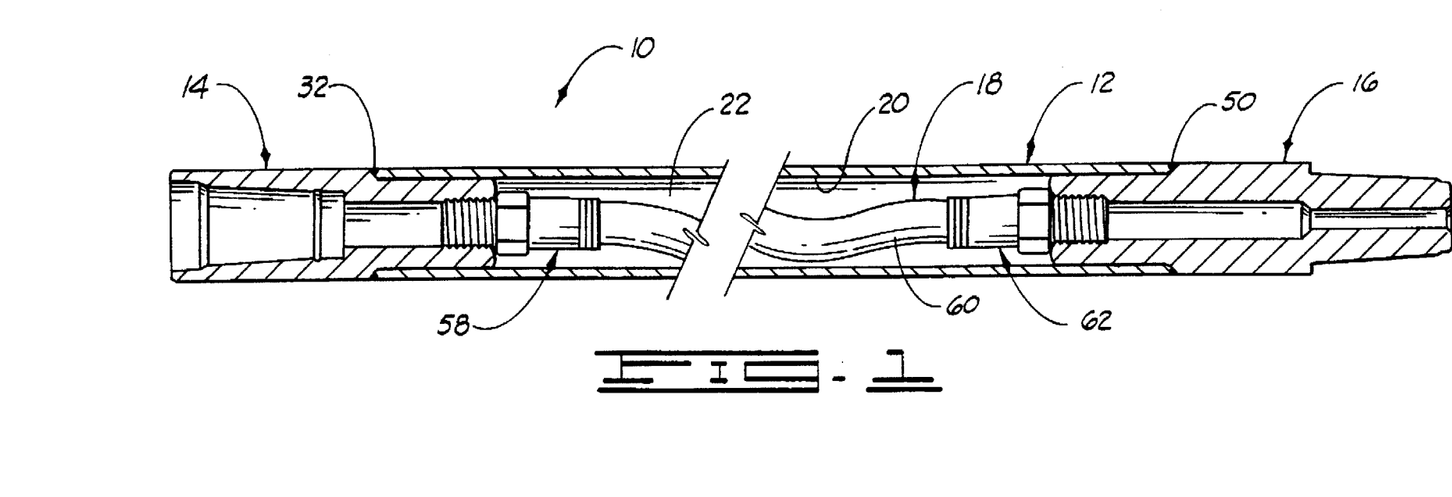
FIG. 1 is a cross-sectional view of a drill pipe of welded construction forming a first embodiment of the present invention.

As can be seen, the drill pipe is formed of a number of elements, including a cylindrical pipe section 12. At a first end of the pipe section is welded a box end 14. At the other end of the pipe section is welded a pin end 16. A hydraulic hose assembly 18 is secured between the ends 14 and 16 and runs within the interior of the pipe section 12. The ends 14 and 16, and pipe section 12, are designed to transmit the forces, including torque, necessary for the drill bit to perform its function. The drilling fluid is conveyed between the ends 14 and 16 within the drill pipe through the hydraulic hose assembly 18.

The design of drill pipe 10 has significant advantages. The pipe section 12, and ends 14 and 16 can be designed to optimize the force carrying characteristics required for the drill bit. A one-piece rotating drill pipe of stiff construction and thin wall is advantageous for economical manufacturing cost. Because the interior surface 20 of the pipe section 12 will not be exposed to drilling fluids, no expensive protective coating need be applied to this interior surface. In prior designs, a coated surface was a requirement to protect the interior wall of the drill pipe from corrosion and to prevent debris, such as rust particles, from traveling in the drilling fluid and plugging up the nozzle openings of the drill bit. This is particularly critical when using low pressure, low flow rate nozzle openings. The pipe section 12 can therefore be designed solely on the basis of torque and force requirements of the drilling unit, and not as a pipeline to convey the drilling fluid.

In addition, the size of the hydraulic hose assembly 18 can be selected to optimize the flow characteristics of the drilling fluid being utilized. In the past, when the drilling fluid simply flowed through the interior volume 22 of the drill pipe, sufficient drilling fluid would have to be pumped into the drill string to fill up each drill pipe before the drilling fluid could be delivered at the drill bit with sufficient flow and pressure. Every time the drilling operation was halted, a portion of this drilling fluid would flow out of the drill string. To initiate further drilling, the lost drilling fluid would have to be replenished in the drill string before the drilling fluid would again be delivered to the drill bit with sufficient pressure and quantity. This procedure contributes to wastage of large volumes of drilling fluids, and drilling operation time delays. In addition to the high cost of drilling fluids, the fluids are becoming an ever greater environmental concern and the elimination of waste of the drilling fluid is an increasingly significant advantage.

Figure 2:
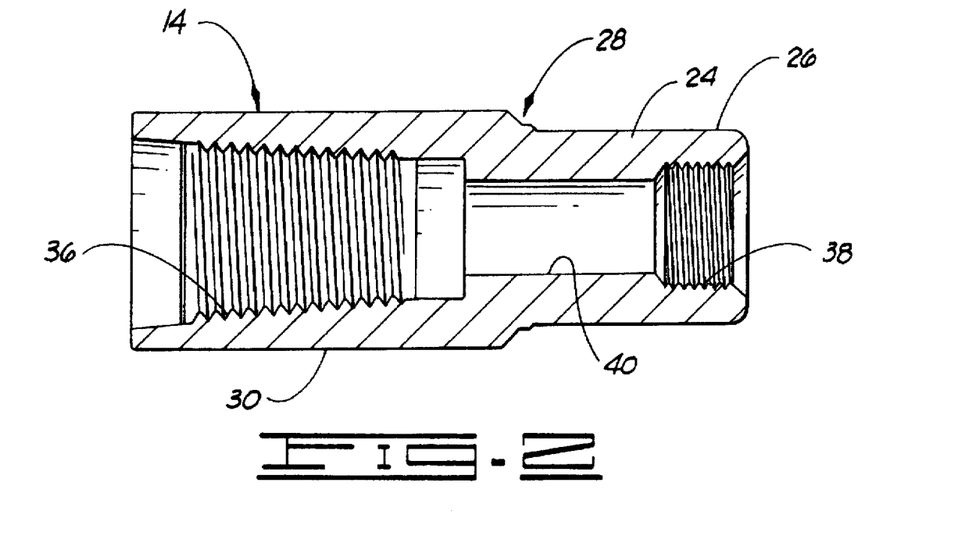
FIG. 2 is a cross-sectional view of a box end used in a drill pipe of welded construction.
Figure 3:
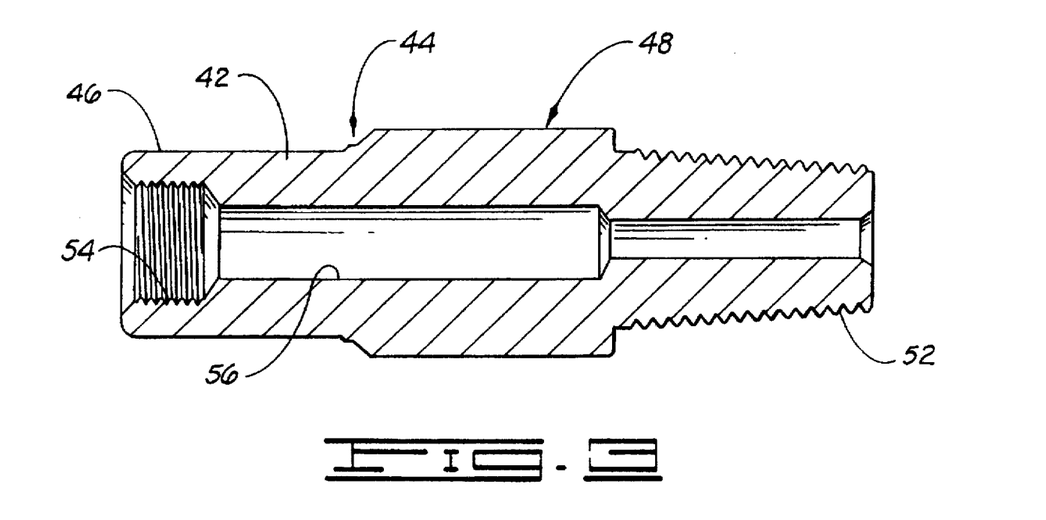
FIG. 3 is a cross-sectional view of a pin end used in a drill pipe of welded construction.

With reference to FIGS. 1–3, further details of the drill pipe 10 will be described. As can be seen, the box end 14 has a reduced diameter portion 24 which has an outer surface 26 designed for a close fit with the interior surface 20 of the pipe section 12. A stepped portion 28 forms a transition between outer surface 26 and the exterior portion 30 of the box end. The portion 28 reduces stress concentration and also provides a groove for the weld bead 32 which secures the box end to the pipe section. The outer diameter of the exterior portion 30 is larger or preferably equal to the outer diameter of the pipe section 12.

Female connection thread 36 is formed in the interior of portion 30 to receive the pin end of the adjacent drill pipe, allowing the drill pipes to be threaded together. A female pipe thread 38 is formed in the reduced diameter portion 24 and a passage 40 is formed through the box end.

The pin end has a reduced diameter portion 42 which is a tight fit with the interior surface 20 of the pipe section 12. A stepped portion 44 forms a transition between the outer surface 46 of the reduced diameter portion 42 and the exterior portion 48 of the pin end. Again, the portion 44 defines a groove for weld bead 50 to weld the pin into the pipe section 12. A male connection thread 52 is formed on the exterior portion 48 to thread the drill pipe to the box end of the adjacent drill pipe. A female pipe thread 54 is formed into the reduced diameter portion 42 and a passage 56 extends through the pin end.

With reference to FIG. 1, the hydraulic hose assembly 18 can be seen to include a male threaded connector 58, a flexible hose 60 and a male threaded connector 62. The male threaded connector 58 is threadedly received in the female pipe threads 38 of the box end. The male threaded connector 62 is threadedly received in the female pipe threads 54 of the pin end 16.

Figure 4:
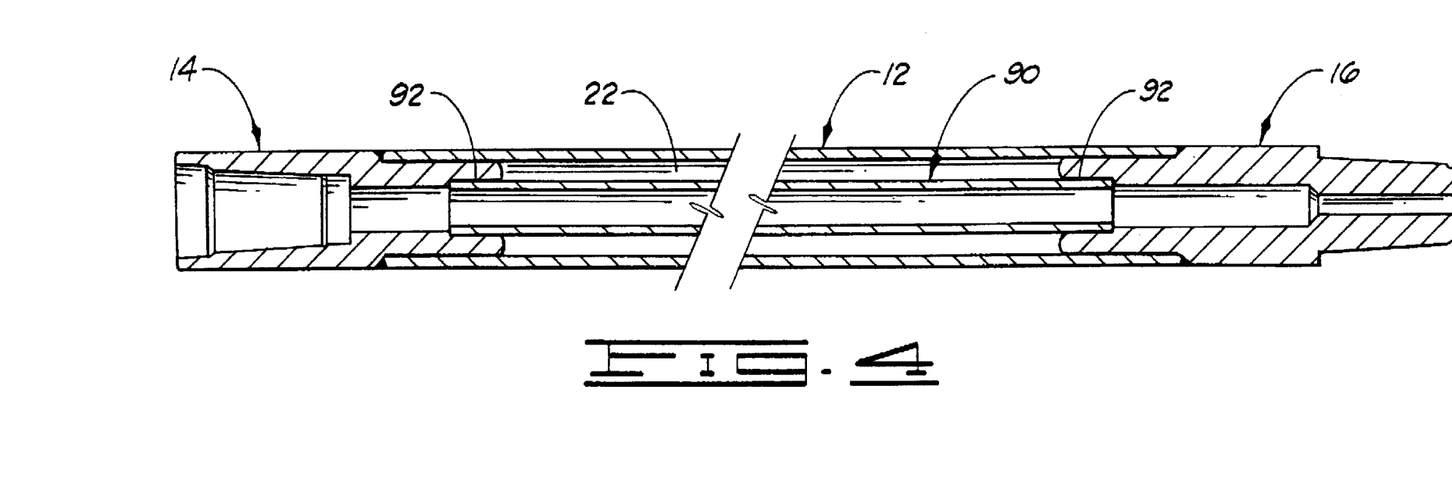
FIG. 4 illustrates a second embodiment of the invention with a drill pipe of arc welded construction with an internal conduit that is a rigid or flexible tube.

If desired, the common hydraulic hose assembly 18 could be replaced by a rigid or flexible tube or hose 90 with ends sealed to the passage through the box and pin ends as shown in FIG. 4. For example, the rigid or flexible tube 90 could have threaded ends to be received in threads 38 and 54. Alternatively, O-ring seals or any other combination of threads, seals, press fits, O-rings, or adhesive joints could be used to join the rigid or flexible tube to the box and pin ends. A press fit joint 92 is shown in FIG. 4. The internal tube 90 could be made of a variety of materials, including stainless steel, some other metal, plastic or composite construction.

The hydraulic hose assembly 18 can be installed in the pipe section 12 and attached to the pin and box ends before inserting the ends 24 and 42 into the pipe section 12 to be welded. It would be possible to have sufficient extra length in the hose 60 to allow the ends to be made up by hand prior to welding the pin and box end in place in the pipe section. Alternatively, as the hose has flexibility, a mechanism could be utilized to stretch the hose sufficiently to tighten the hose assembly to the box and pin ends using little or no excess hose within the pipe section.

Figure 5:
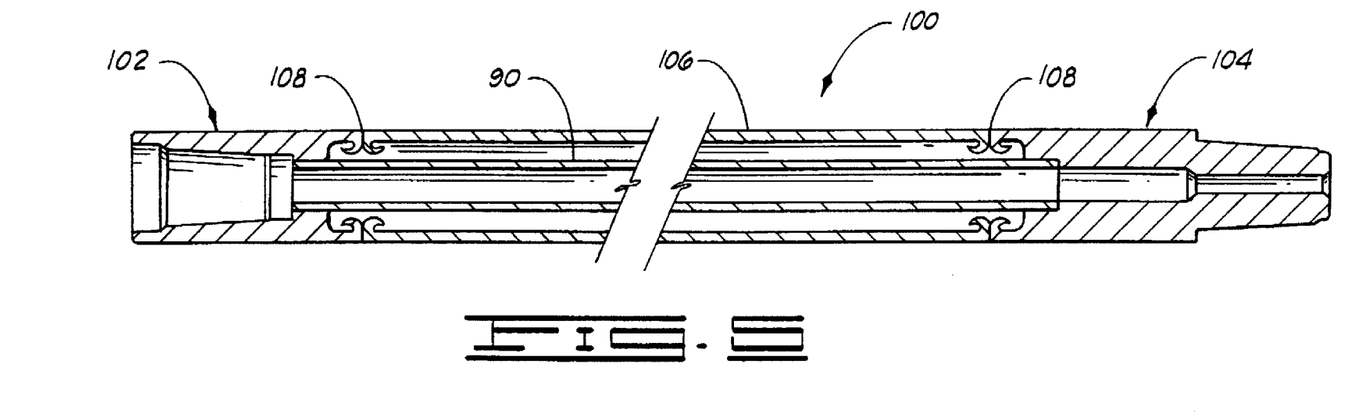
FIG. 5 illustrates a modification of the second embodiment of the invention with a drill pipe with an internal conduit, with the drill pipe of spin, inertia, or friction weld construction.

The rigid or flexible tubing or hose would be installed in a manner similar to that used in the common hydraulic hose installation. Alternatively, the tubing could be installed after the drill pipe elements are assembled or formed together. This could allow friction welded construction of the drill pipe and replacement repair of the tube. FIG. 5 illustrates a drill pipe 100 having box end 102 and pin end 104 friction welded at welds 108 onto the pipe section 106. The tube 90 is sealed at its ends to the box end 102 and pin end 104.

Figure 6:
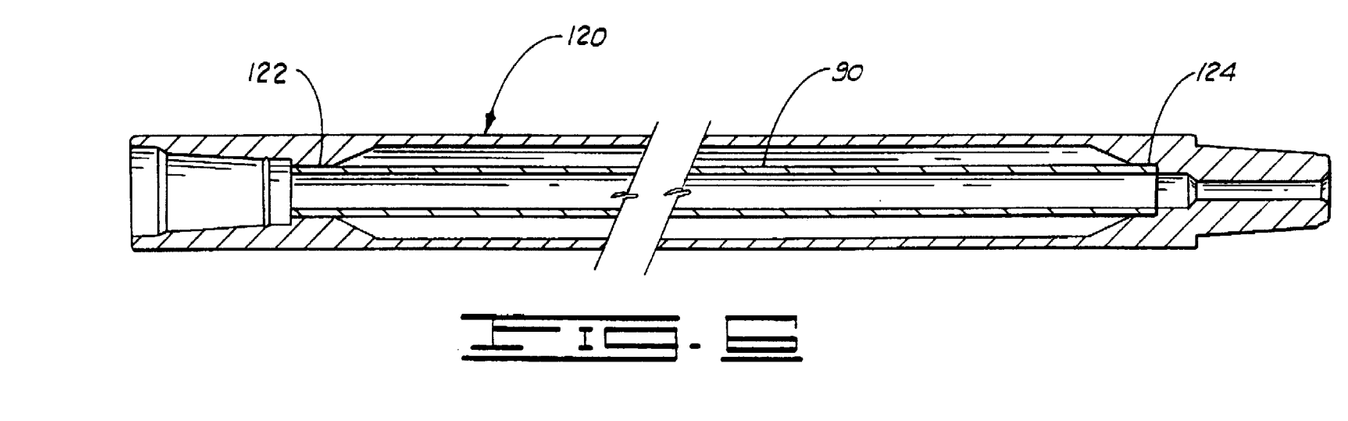
FIG. 6 illustrates another modification of the second embodiment of the invention with a drill pipe with an internal conduit that is a rigid or flexible tube and the drill pipe shows one type of forged upset end construction.

Also, this could allow the tubing to be installed in a drill pipe 120 of forged upset ends 122 and 124 as seen in FIG. 6, and/or machined, and/or threaded joint end or ends construction. This "non-welded" construction of the drill pipe is required for some drilling applications. This method of design would also allow replacement repair of the tube.

In accordance with drill pipe assembled using the teachings of the present invention, the drill pipe in service was judged roughly equivalent to current fusion bonded epoxy coated drill pipe in corrosion resistance but at significantly less cost and higher, more uniform quality. The drilling fluid volume contained inside the drill pipe was decreased approximately 86% from drill pipe without a hose assembly, leading to a significant reduction in wasted drill fluid, especially when removing drill pipe during a backreaming operation. The response time required to bring the drill pipe to the appropriate fluid pressure for drilling and backreaming was also greatly reduced by the reduction of fluid volume inside the drill string.

FIGS. 7–10 illustrate a third embodiment of the present invention forming a drill pipe 200. A number of elements of drill pipe 200 are identical to that of drill pipe 10 and are identified by the same reference numerals. However, the hydraulic hose 202 utilized in drill pipe 200 has an outer diameter which is just slightly less than the inner diameter of the inner surface 20 of the pipe section 12. Also, inserted into each end of the hose is the reduced end portion 203 of a hose end fitting 204 as seen in FIG. 7B. The hose end fittings 204 contact the box end 14 and pin end 16 but are not attached or sealed thereto. A flow path is formed through passage 40, the passages 205 formed through hose fittings 204, the hose 202, and passage 56.

Figure 7:
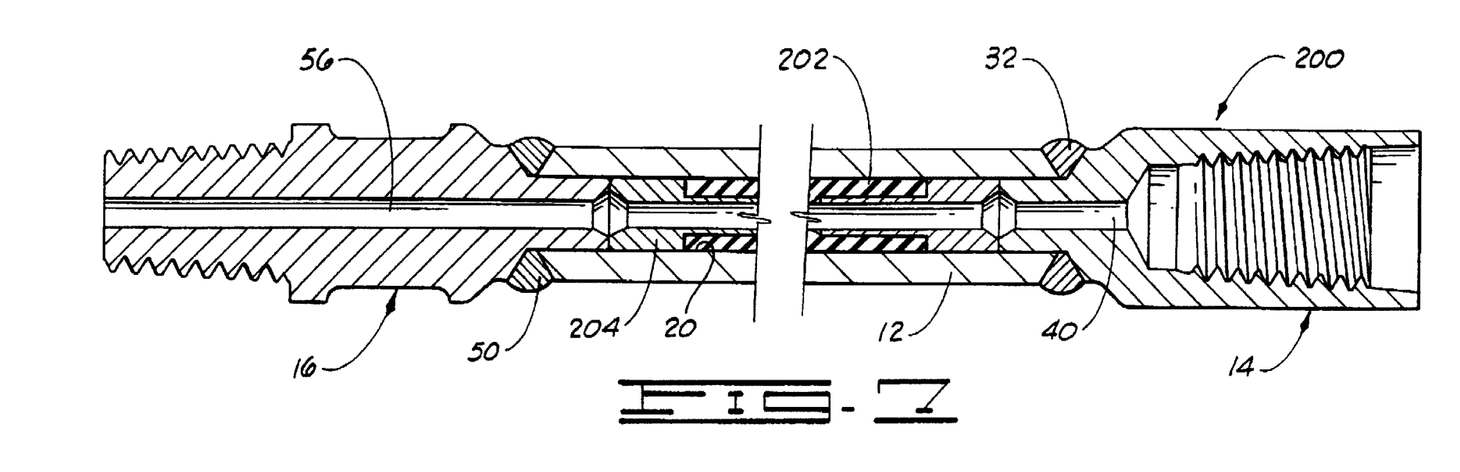
FIG. 7 is a cross-sectional view of a drill pipe of welded construction forming a third embodiment of the present invention.
Figure 8:
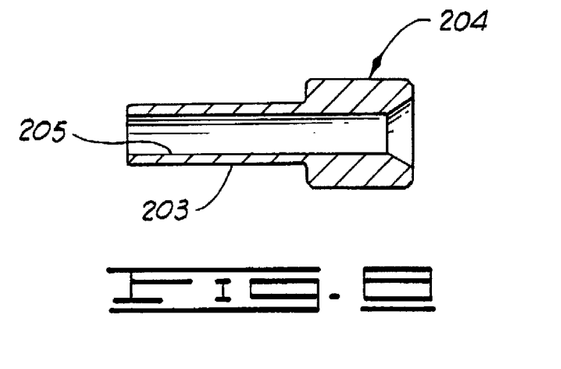
FIG. 8 is a detail view of a hose fitting used in the third embodiment.

As noted, the hose fittings 204 are not sealed to or attached to the box end 14 and pin end 16. Thus, fluid is permitted to escape or leak between the abutting ends of the hose fittings and the ends 14 and 16 and into the annulus formed between the outer surface of the hose 202 and the inner surface 20 of the pipe section 12. During use, rust may form on the inner surface 20, but it is mostly trapped between the outer surface of the hydraulic hose 202 and the inner surface 20 and large quantities of rust particles will not therefore enter the main fluid stream passing through the interior of the hydraulic hose 202. The advantages of the present invention are therefore maintained as the interior volume of the drill pipe 200 is reduced by the volume of the hydraulic hose 202 and the hose fittings 204 and the rust problem is controlled. The difference in diameter between the outer surface of the hose and the inner surface of the pipe section was only 0.01675" in one drill pipe made in accordance with the teachings of the present invention.

The hose 202 can be sealed to the reduced diameter portions of the hose fittings 204 or not as desired. The use of hose fittings 204 is primarily to act as mechanical protection for the ends of the hydraulic hose 202, which otherwise would be exposed to the high pressure fluid flow traveling through the ends 14 and 16. Without such protection, this high velocity flow would likely tear, render or otherwise distort the hose which, in the worst case, could block the passage through the drill pipe.

Figure 9:
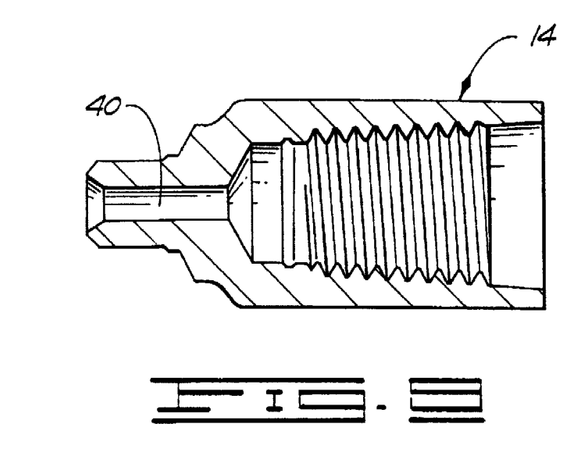
FIG. 9 is a cross-sectional view of a box end used in the drill pipe of welded construction of FIG. 7A.
Figure 10:
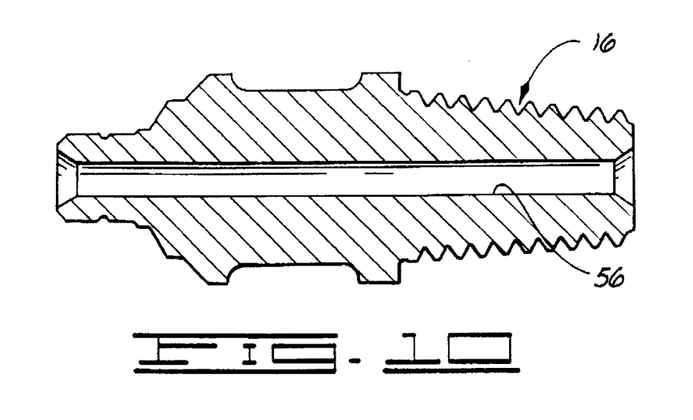
FIG. 10 is a cross-sectional view of a pin end used in the drill pipe of welded construction of FIG. 7A.

The drill pipe 200 thus has a number of advantages over the previous embodiments described. Namely, as there is no concern to have sealed connections between the tube or hydraulic hose and the ends of the pipe, the cost of such fittings are eliminated. Further, the drill pipe can be made up quicker and with less effort because sealed connections are not used. With this design, as shown in FIGS. 8 and 9, the female pipe thread 38 of box end 14 and female pipe thread 54 of pin end 16 are eliminated. Also, the unsealed tube or hose does not bear the stresses involved when a sealed tube holds a high internal pressure against a much lower external pressure. Thus, the conduit construction can be simpler and less expensive.

Figure 11:
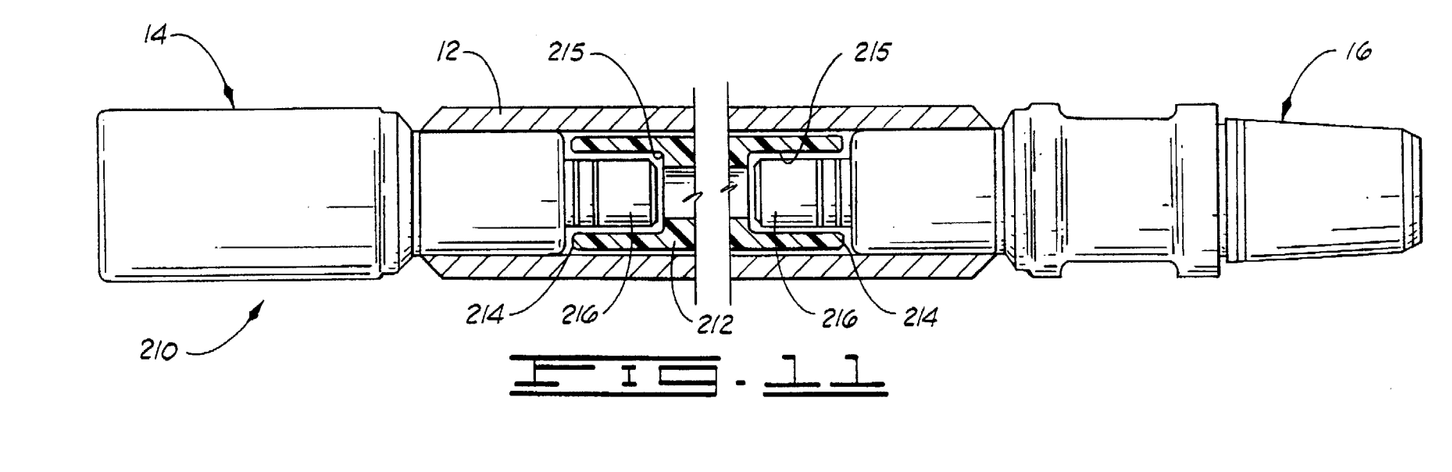
FIG. 11 illustrates a fourth embodiment of the invention with a drill pipe of arc welded construction with an internal conduit that is a rigid or flexible tube.
Figure 12:
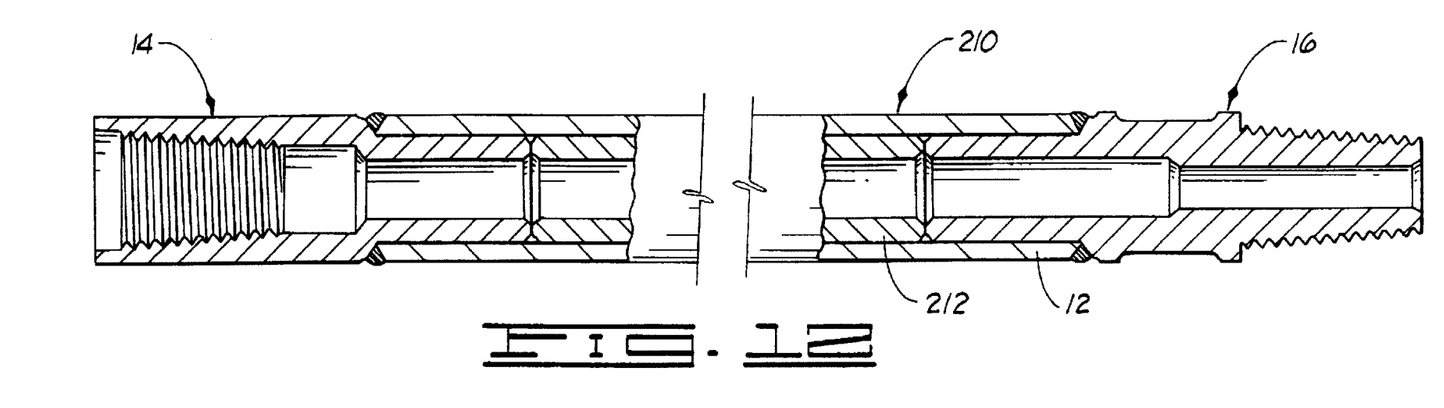
FIG. 12 illustrates a modification of the fourth embodiment of the invention having a drill pipe with an internal conduit with arc welded ends having no extension.

With reference to FIG. 11, the drill pipe 210 can be seen to use a rigid or flexible tube 212, preferably of PVC plastic, which has an outer diameter very slightly less than the inner diameter of the pipe section 12 of the drill pipe 210. Again, the ends 214 of the tube or hose 212 can bear against the inner ends of the box end 14 and pin end 16 to form a continuation of the passage through the ends but without being sealed to the ends. Therefore, the fluid can again pass to the annulus between the outer diameter of the tube 212 and the inner surface 20 of the pipe section 12. However, again whatever rust generation occurs will be to a large extent trapped within that annulus.

The ends of the tube 212 are preferably drilled to form recesses 215 to receive the extension 216 of ends 14 and 16, with a clearance of preferably 0.04 inches between the outer surface of the extensions 216 of the ends 14 and 16 and the inner surface of recesses 215 in the tube 212.

With reference now to FIG. 11, a drill pipe 210 can be seen to be formed having box end 14 and pin end 16 arc welded at welds onto the pipe section. The box end 14 and pin end 16 do not have extensions as described in the embodiments of FIGS. 7A–10. The end of the tube 212 simply bears against the inner end of the box end 14 and pin end 16. Again, fluid can leak between the box end, pin end and tube 212 into the annulus between the outer surface of the tube 212 and the inner surface 20 of the pipe section.

Figure 13:
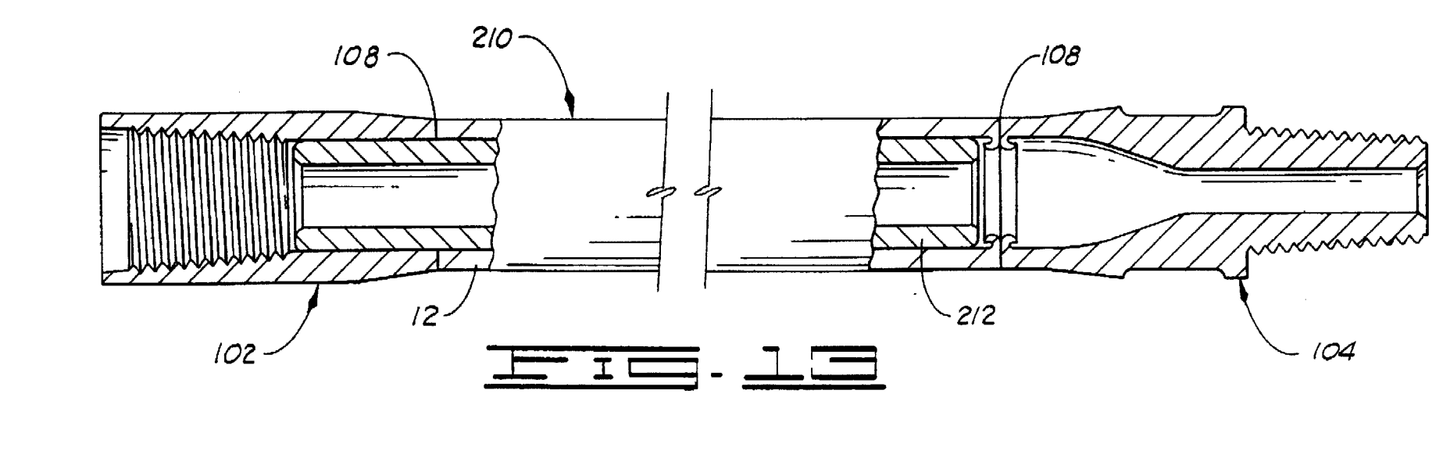
FIG. 13 illustrates a modification of the fourth embodiment of the invention having a drill pipe with an internal conduit, with the drill pipe of spin, inertia, or friction weld construction.
Figure 14:
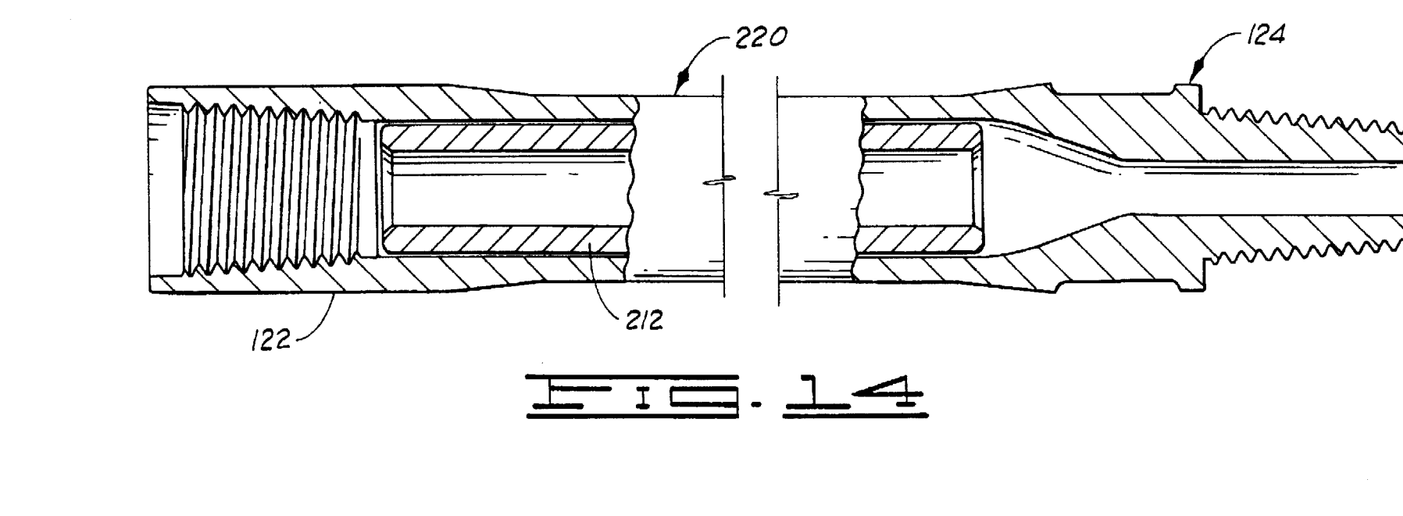
FIG. 14 illustrates another modification of the fourth embodiment of the invention with an internal conduit that is a rigid or flexible tube and the drill pipe shows one type of forged upset end construction.

With reference to FIG. 13, the drill pipe 210 can be seen to be formed having box end 102 and pin end 104 friction welded at welds 108 onto the pipe section 12. The tube 212 is again not sealed at its ends to the box end 102 and pin end 104. A flush trim is preferably done on the weld flash from the weld between the box end inside diameter 102 and the pipe section 12 to allow the tube 212 to be inserted into the interior volume of the drill pipe through the box end after the ends have been welded on the pipe section.

With reference to FIG. 13, drill pipe 220 can be formed with forged upset ends 122 and 124 and/or machine, and/or threaded joint end or ends construction. The tube 212 would fit within the drill pipe 220 and bear against the forged upset end 124 to form a continuous passage through the drill pipe without being sealed to the upset ends. The tube is inserted into the drill pipe through the box upset end 122.

With reference now to FIGS. 15–18, a fifth embodiment of the invention is illustrated and is formed by drill pipe 250. Again, the drill pipe 250 is formed of a pipe section 12 with a box end 14 arc welded at one end of the pipe section 12 and a pin end 16 arc welded at the other end of the pipe section 12. Each of the ends 14 and 16 have a threaded aperture 252 formed at their inner ends which face the interior of the drill pipe.

Figure 15:
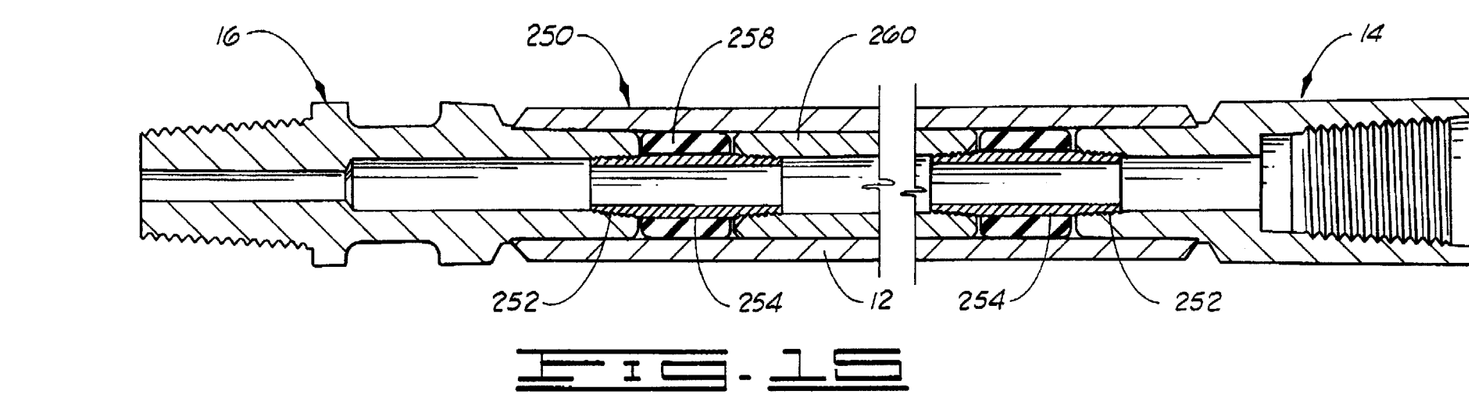
FIG. 15 illustrates a fifth embodiment of the invention with a drill pipe of arc welded construction with an internal conduit that is a rigid or flexible tube which incorporates pipe nipples and insulator bushings.

Two pipe nipples 254 are provided which each have threaded ends 256. One threaded end of each of the pipe nipples 254 is threadedly engaged with the threaded aperture 252 in each of the ends 14 and 16. Thus, the pipe nipples 254 effectively form extensions of the box end and pin end into the interior of the pipe section.

Figure 17:
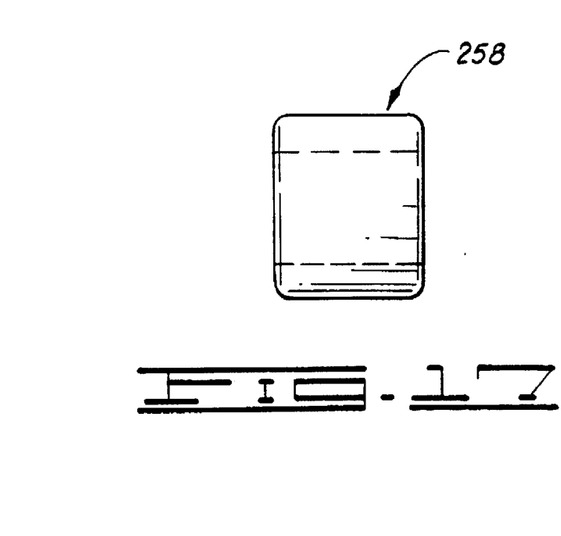
FIG. 17 is a view of the insulator bushing.

An insulator bushing 258 is received over each of the pipe nipples 254 as shown in FIG. 15. The inner diameter of the insulator bushing 258 is sufficiently larger than the outer diameter of the pipe nipple 254 to allow an easy slip fit over the nipple. There is no desire for a tight or sealed fit between the insulator bushing and the pipe nipple. The outer diameter of the insulating bushing is somewhat less than the inner diameter of the inner surface 20 of the pipe section 12.

Figure 16:
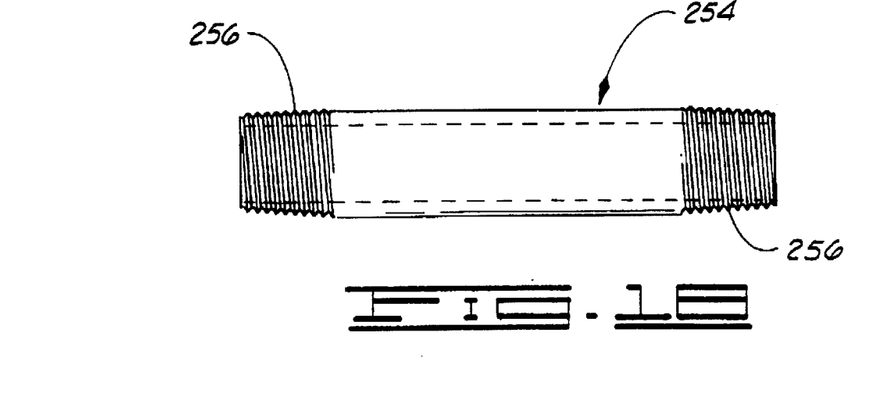
FIG. 16 is a view of the rigid or flexible tube.

Rigid or flexible tube 260 is placed within the interior of the pipe section 12 with a portion of each of the pipe nipples 254 extending into the ends of the rigid or flexible tube 260. As best seen in FIG. 16, the rigid or flexible tube has a bore 262 formed through its entire length to form a continuation of the passage through the drill pipe and a larger diameter recess 264 in each end of the tube to receive the ends of the pipe nipples 254. The rigid or flexible tube is preferably formed of PVC plastic. However, other materials are suitable including other plastics, various metals or composites. Of the metals, aluminum would be particularly suitable. In the composites, a composite wound tubing or plastic filament wound tubing or hydraulic hose would be suitable.

In one drill pipe constructed in accordance with the teachings of the present invention, the rigid tube 260 was formed of PVC having an outer diameter of about 1.165 inches and a bore of about 0.51 inch. The diameter of the recess was 0.719 inch and the recess was about 2.2 inches deep. The insulator bushing had an outer diameter of 1.165 inches and an inner diameter of about 0.719 inch. The bushing was about one inch long and was formed of well seasoned, select grade, yard lumber such as white birch, silver maple or big leaf maple.

The nipple was formed of Schedule 40 pipe steel having three-eighths inch national pipe threads cut at each end. The nipple was about three and one-half inches long. The outer diameter of the nipple was 0.675 inch and the inner diameter was 0.493 inch forming a wall thickness of 0.091 inch. The gap between the outer surface of the rigid tube and insulator bushings 258 and the inner surface 20 is in the range of 0.013 inch to 0.028 inch.

The function of the insulator bushings 258 is to prevent damage to the PVC tube 260 as the ends 14 and 16 are being arc welded to the pipe section 12. In designs with friction welding and upset forming, the tube simply slips in the box end of the drill pipe after the pipe has been manufactured. Once the drill pipe has been used in service, the build up of fluids, grit and rust will usually cause the tubes to stay within the drill pipe unless effort is undertaken to remove them. Field replacement of worn or otherwise damaged liner tubes would be possible.

Now it will be appreciated that the present invention provides a drill pipe for use in a drill string and with a rotary boring machine, the drill pipe having a number of advantages. The inner members, or the drilling fluid conveying device, of a drill string comprised of the drill pipe of the present invention are connector-free, resulting in reduced manufacturing costs. Further, the inner member of one such drill pipe is isolated from the inner member of an adjacent drill pipe in the drill string, resulting in quicker makeup and breakout of drill pipe in the string. This, in turn, permits a savings in time and manpower at the job site. The unsealed, connector-free inner members are not required to share the torsion, compression and tensile stresses endured by the connected string of outer members, as is the case in dual member drill strings comprising connected inner members. The inner member does not bear the stresses of high internal pressure involved when a sealed internal string holds high pressure against a lower external pressure. Moreover, the smaller volume inner member requires less drilling fluid, allows the drilling fluid to be pressurized more rapidly to initiate and resume drilling operations and limits fluid spill damage to the environment.

Although several embodiments of the invention have been illustrated and described with numerous specific details in the foregoing description and accompanying drawings, it will be understood that the invention is not limited to the embodiment disclosed, but is capable of numerous rearrangements, modifications and substitutions of parts and elements without departing from the spirit and scope of the invention.

We claim:

1. A drill pipe for use in a drill string rotating a drill bit or backreaming tool and conveying a drilling fluid, comprising:

a pipe section having an interior and a first end and a second end;

a pin end having a male threaded portion and a passage formed therethrough, the pin end secured to the first end of the pipe section;

a box end having a female threaded portion and a passage formed therethrough, the box end secured to the second end of the pipe section;

a drilling fluid conveying device positioned between the pin end and the box end and within the pipe section to convey drilling fluid through the pipe section interior but not sealed to the pin end or box end, the drilling fluid conveying device having a central passage therethrough conveying a portion of the drilling fluid, the drilling fluid conveying device having an exterior surface, an annulus formed between the exterior surface and the interior of the pipe section, the remainder of the drilling fluid flowing through the annulus; and the drilling fluid conveying device including a hose having a first end and a second end, a first hose fitting fit within the first end of the hose and a second hose fitting fit within the second end of the hose.

2. A drill pipe for use in a drill string rotating a drill bit or backreaming tool and conveying a drilling fluid, comprising:

a pipe section having a first end and a second end, the pipe section further having an inner surface;

a pin end having a male threaded portion and a passage formed therethrough, the pin end secured to the first end of the pipe section;

a box end having a female threaded portion and a passage formed therethrough, the box end secured to the second end of the pipe section;

a drilling fluid conveying device attached between the pin end and the box end to convey drilling fluid through the pipe section interior, the drilling fluid conveying device and pipe section defining an enclosed volume therebetween isolated from the drilling fluid conveyed through the pipe section interior; and said drilling fluid conveying device being a hydraulic hose assembly, the hydraulic hose assembly comprising a common hydraulic hose and further comprising threaded hydraulic hose connectors at each end of the hydraulic hose, one of the threaded hydraulic hose connectors threadedly secured to the pin end and the other of the hydraulic hose connectors threadedly secured to the box end.

3. A method of drilling wherein the drilling is performed by a drill string extending to a drill bit, the drill string formed of a plurality of drill pipes, each drill pipe having a male threaded end and a female threaded end and a passage formed therethrough for passage of drilling fluid to the drill bit, the interior of the drill pipe having a predetermined volume, comprising the steps of:

attaching a first end of a hydraulic hose to the male threaded end of the drill pipe and the other end of the hydraulic hose to the female end of the drill pipe, the hose passing through the passage in the drill pipe and defining an isolated chamber between the hydraulic hose and the interior of the drill pipe;

conveying the drilling fluid through the pipe section within the hydraulic hose, the interior volume of the drill pipe with the hydraulic hose being less than the predetermined volume within the drill pipe, thus conserving drilling fluid and limiting fluid spill damage to the environment.

4. A method of drilling or backreaming wherein the drilling or backreaming is performed by a drill string extending to a drill bit or backreaming tool, the drill string formed of a plurality of drill pipes, each drill pipe having a male threaded end and a female threaded end and a passage formed therethrough for passage of drilling fluid to the drill bit, the interior of the drill pipe having a predetermined volume, the drill pipe further defining an interior surface, comprising the steps of:

attaching a first end of a rigid or flexible tube to the male threaded end of the drill pipe and the other end of the tube to the female threaded end of the drill pipe, the tube passing through the passage in the drill pipe and defining an enclosed volume between the tube and the interior surface of the drill pipe; and conveying the drilling fluid through the drill pipe within the tube, the interior volume of the drill pipe with the tube being less than the predetermined volume within the drill pipe, conserving drilling fluid and limiting fluid spill damage to the environment.

5. A drill pipe for use in a drill string rotating a drill bit or backreaming tool and conveying a drilling fluid, comprising:

a pipe section having a predetermined diameter established by the torque and force carrying requirements of the drill string to rotate, advance and steer the drill bit or the backreaming tool, the pipe section having a first end and a second end and an inner surface;

a pin end having a male threaded portion to threadedly attach the drill pipe to an adjacent drill pipe, the pin end having a passage formed therethrough, the pin end further having a female threaded portion at one end of the passage, the pin end welded to the first end of the pipe section;

a box end having a female threaded portion for attachment to an adjacent drill pipe, the box end further having a passage formed therethrough, a female threaded portion being formed at one end of the passage, the box end welded to the second end of the pipe section; and a hydraulic hose assembly having a first male threaded end, a second male threaded end and a flexible hydraulic hose extending between the male ends, the male ends being threadable in the female threaded portions at the passage through the pin and box ends, the interior diameter of the hydraulic hose being determined by the flow requirements for the drilling fluid, the hydraulic hose assembly having an exterior, the exterior of the hydraulic hose assembly and the inner surface of the pipe section defining an enclosed volume which is not exposed to the drilling fluid.

6. A drill pipe for use in a drill string rotating a drill bit or a backreaming tool and conveying a drilling fluid, comprising:

a pipe section having a predetermined diameter established by the torque and force carrying requirements of the drill string to rotate, advance and steer the drill bit or backreaming tool, the pipe section having a first end and a second end and an inner surface;

a pin end having a male threaded portion to threadedly attach the drill pipe to an adjacent drill pipe, the pin end having a passage formed therethrough, the pin end further having a female portion at one end of the passage, the pin end welded to the first end of the pipe section;

a box end having a female threaded portion for attachment to an adjacent drill pipe, the box end further having a passage formed therethrough, the box end further having a female portion at one end of the passage, the box end welded to the second end of the pipe section; and a rigid or flexible tube assembly having a tube with a first end and a second end, the ends being receivable in the female portions at the passage through the pin and box ends and sealed thereto, the interior diameter of the tube being determined by the flow requirements for the drilling fluid, the tube assembly having an exterior surface, the exterior surface of the tube assembly and the inner surface of the pipe section defining an enclosed chamber which is not exposed to the drilling fluid passing through the tube assembly.

7. A drill pipe for use in a drill string rotating a drill bit or a backreaming tool and conveying a drilling fluid, comprising:

a pipe section having a predetermined diameter established by the torque and force carrying requirements of the drill string to rotate, advance and steer the drill bit or backreaming tool, the pipe section having a first end and a second end and defining an inner surface;

a pin end having a male threaded portion to threadedly attach the drill pipe to an adjacent drill pipe, the pin end having a passage formed therethrough, the pin end further having a female portion at one end of the passage, the pin end attached to the first end of the pipe section by any combination of forging and/or machining and/or threading operations;

a box end having a female threaded portion for attachment to an adjacent drill pipe, the box end further having a passage formed therethrough, the box end further having a female portion at one end of the passage, the box end attached to the second end of the pipe section by any combination of forging and/or machining and/or threading operations; and a rigid or flexible tube assembly having a tube with a first end and a second end, the ends being receivable in the female portions at the passage through the pin and box ends and sealed thereto, the interior diameter of the tube being determined by the flow requirements for the drilling fluid, said tube assembly having an exterior surface, the exterior surface of the tube assembly and the inner surface of the pipe section defining an enclosed volume which is not exposed to the drilling fluid.

8. A drill pipe for use in a drill string rotating a drill bit or backreaming tool and conveying a drilling fluid, comprising:

a pipe section having a first end and a second end and an interior surface;

a pin end having a male threaded portion and a passage formed therethrough, the pin end secured to the first end of the pipe section;

a box end having a female threaded portion and a passage formed therethrough, the box end secured to the second end of the pipe section and;

a drilling fluid conveying device positioned between the pin end and the box end and having a central passage therethrough conveying a portion of the drilling fluid, the drilling fluid conveying device having an exterior surface, an annulus formed between the exterior surface and the interior surface of the pipe section, the remaining portion of the drilling fluid flowing through the annulus, the annulus sufficiently small to resist movement of rust from the interior surface of the pipe section from being carried along the annulus by the drilling fluid.

9. The drill pipe of claim 8 wherein the annulus is about 0.017 inches.

10. The drill pipe of claim 8 further comprising a first insulator/spacer bushing positioned between a first end of the drilling fluid conveying device and the pin end and a second insulator/spacer bushing positioned between a second end of the drilling fluid conveying device and the box end.

11. The drill pipe of claim 10 wherein the insulator/spacer bushings are wood.

12. The drill pipe of claim 8 wherein the annulus is between about 0.013 to 0.028 inches.

13. A drill pipe for use in a drill string rotating a drill bit or backreaming tool and conveying a drilling fluid, comprising:

a pipe section having an interior surface and a first end and a second end;

a pin end having a male threaded portion and a passage formed therethrough, the pin end secured to the first end of the pipe section;

a box end having a female threaded portion and a passage formed therethrough, the box end secured to the second end of the pipe section; and a drilling fluid conveying device positioned between the pin end and the box end within the interior of the pipe section, the drilling fluid conveying device having a central passage therethrough conveying a portion of the drilling fluid, the drilling fluid conveying device having an exterior surface, an annulus formed between the exterior surface of the drilling fluid conveying device and the interior surface of the pipe section, sufficient quantity of the remaining portion of the drilling fluid flowing through the annulus to maintain generally equal pressure within the passage in the drilling fluid conveying device and on the exterior surface of the drilling fluid conveying device.

14. The drill pipe of claim 13 wherein the drilling fluid conveying device is a tube, the tube having first and second ends, recesses being formed in the ends of the tube, the pin end and the box end each having extensions extending into a recess of the tube.

15. The drill pipe of claim 14 wherein a clearance of approximately 0.04 inches is formed between the outer surface of the extensions and the inner surface of the recesses.

16. The drill pipe of claim 13 further comprising a first insulator/spacer bushing positioned between a first end of the drilling fluid conveying device and the pin end and a second insulator/spacer bushing positioned between a second end of the drilling fluid conveying device and the box end.

17. The drill pipe of claim 16 wherein the insulator/spacer bushings are wood.

18. A drill pipe for use in drill strings in rotary boring applications using drilling fluid, the drill pipe comprising:
an elongate, hollow outer member having first and second ends;
a first connector member supported at the first end of the outer member and a second connector member supported at the second end of the outer member, wherein the first connector member is correlative with the second connector member of an adjacent like outer member to form successive lengths of drill pipe and wherein the first and second connector members are adapted to transmit drilling fluid; and
a connector-free inner member adapted to transmit drilling fluid, the inner member being positioned generally coaxially within the outer member and forming an annulus between the inner member and the outer member;
wherein the inner member is nonsealably adjoined with a connector member to permit communication of drilling fluid through the inner member and the annulus and wherein the inner member is isolated from the inner member of a connected, like adjacent drill pipe.

19. The drill pipe of claim 18 wherein the first connector member comprises a threaded pin end and the second connector member comprises a threaded box end correlative with the threaded pin.

20. The drill pipe of claim 19 further comprising a first insulator/spacer bushing positioned between a first end of the inner member and the pin end and a second insulator/spacer bushing positioned between a second end of the inner member and the box end.

21. The drill pipe of claim 20 wherein the insulator/spacer bushings are wood.

22. The drill pipe of claim 18 wherein the connector members are arc welded to the outer member.

23. The drill pipe of claim 18 wherein the connector members are upset forged from the outer member.

24. The drill pipe of claim 18 wherein the connector members are friction welded to the outer member.

25. The drill pipe of claim 18 wherein the inner member comprises a tube.

26. The drill pipe of claim 18 wherein the inner member comprises a hose.

27. The drill pipe of claim 18 wherein the inner member defines a passage through which at least a portion of the drilling fluid is conveyed and wherein each connector member forms a passage continuous with the passage through the inner member.

28. The drill pipe of claim 27 further comprising an extension member adapted to nonsealably adjoin the passage of the inner member with the passage of the connector member.

29. The drill pipe of claim 28 wherein:
the inner member comprises a tube having first and second ends adapted to receive an extension member; and
the extension member forms a passage which, when the extension member is assembled with the tube, adjoins the passage in the connector member to create a continuous passage through the connector members and the tube.

30. The drill pipe of claim 28 wherein:
the inner member comprises a hose having first and second ends adapted to receive an extension member; and
the extension member comprises a hose fitting and forms a passage which, when the extension member is assembled with the hose, adjoins the passage in the connector member to create a continuous passage through the connector member and the hose.

31. The drill pipe of claim 28 wherein:
the inner member comprises a tube having first and second ends adapted to receive an extension member;
the extension member comprises a pipe nipple having first and second threaded ends and forms a passage therethrough;
the first and second connector members each define a threaded aperture correlative with the threaded ends of the pipe nipple;
wherein when the pipe nipple is assembled with the tube and the connector member, the passage in the pipe nipple connects the passage through the connector member with the passage through the tube.

32. The drill pipe of claim 31 further comprising a support member forming a central aperture and receivable over the pipe nipple to support the pipe nipple within the outer member.

33. A system of drill pipe for use in rotary boring applications using drilling fluid, the system comprising:
a plurality of drill pipe, each drill pipe comprising:
an elongate, hollow outer member having first and second ends;
a first connector member supported at the first end of the outer member and a second connector member supported at the second end of the outer member, wherein the first connector member is correlative with the second connector member of an adjacent like outer member to form successive lengths of drill pipe and wherein the first and second connector members are adapted to transmit drilling fluid; and
a connector free inner member adapted to transmit drilling fluid, the inner member being positioned generally coaxially within the outer member and forming an annulus between the inner member and the outer member;
wherein the inner member is nonsealably adjoined with a connector member to permit communication of drilling fluid through the inner member and the annulus and wherein the inner member is isolated from the inner member of a connected, like adjacent drill pipe.

34. The system of drill pipe of claim 33 wherein the first connector member comprises a threaded pin end and the second connector member comprises a threaded box end correlative with the threaded pin.

35. The system of drill pipe of claim 33 wherein the connector members are arc welded to the outer member.

36. The system of drill pipe of claim 33 wherein the connector members are upset forged from the outer member.

37. The system of drill pipe of claim 33 wherein the connector members are fiction welded to the outer member.

38. The system of drill pipe of claim 33 wherein the inner member comprises a tube.

39. The system of drill pipe of claim 33 wherein the inner member comprises a hose.

40. The system of drill pipe of claim 33 wherein the inner member defines a passage through which at least a portion of the drilling fluid is conveyed and wherein each connector member forms a passage continuous with the passage through the inner member.

41. The system of drill pipe of claim 40 further comprising an extension member adapted to nonsealably adjoin the passage of the inner member with the passage of the connector member.

42. The system of drill pipe of claim 41 wherein:
   the inner member comprises a tube having first and second ends adapted to receive an extension member; and
   the extension member forms a passage which, when the extension member is assembled with the tube, adjoins the passage in the connector member to create a continuous passage through the connector members and the tube.

43. The system of drill pipe of claim 41 wherein:
   the inner member comprises a hose having first and second ends adapted to receive an extension member; and
   the extension member comprises a hose fitting and forms a passage which, when the extension member is assembled with the hose, adjoins the passage in the connector member to create a continuous passage through the connector member and the hose.

44. The system of drill pipe of claim 44 wherein:
   the inner member comprises a tube having first and second ends adapted to receive an extension member;
   the extension member comprises a pipe nipple having first and second threaded ends and forms a passage therethrough;
   the first and second connector members each define a threaded aperture correlative with the threaded ends of the pipe nipple;
   wherein when the pipe nipple is assembled with the tube and the connector member, the passage in the pipe nipple connects the passage through the connector member with the passage through the tube.

45. The system of drill pipe of claim 44 further comprising a support member forming a central aperture and receivable over the pipe nipple to support the pipe nipple within the outer member.

46. A horizontal boring machine comprising a spindle for connecting a drill string to the horizontal boring machine, the drill string comprising a plurality of drill pipe, each drill pipe comprising:
   an elongate, hollow outer member having first and second ends;
   a first connector member supported at the first end of the outer member and a second connector member supported at the second end of the outer member, wherein the first connector member is correlative with the second connector member of an adjacent like outer member to form successive lengths of drill pipe and wherein the first and second connector members are adapted to transmit drilling fluid; and
   a connector free inner member adapted to transmit drilling fluid, the inner member being positioned generally coaxially within the outer member and forming an annulus between the inner member and the outer member;
   the inner member is nonsealably adjoined with a connector member to permit communication of drilling fluid through the inner member and the annulus and wherein the inner member is isolated from the inner member of a connected, like adjacent drill pipe.

47. The drill pipe of claim 46 wherein the first connector member comprises a threaded pin end and the second connector member comprises a threaded box end correlative with the threaded pin.

48. The drill pipe of claim 46 wherein the connector members are arc welded to the outer member.

49. The drill pipe of claim 46 wherein the connector members are upset forged from the outer member.

50. The drill pipe of claim 46 wherein the connector members are friction welded to the outer member.

51. The drill pipe of claim 46 wherein the inner member comprises a tube.

52. The drill pipe of claim 46 wherein the inner member comprises a hose.

53. The drill pipe of claim 46 wherein the inner member defines a passage through which at least a portion of the drilling fluid is conveyed and wherein each connector member forms a passage continuous with the passage through the inner member.

54. The drill pipe of claim 53 further comprising an extension member adapted to nonsealably adjoin the passage of the inner member with the passage of the connector member.

55. The drill pipe of claim 54 wherein:
   the inner member comprises a tube having first and second ends adapted to receive an extension member; and
   the extension member forms a passage which, when the extension member is assembled with the tube, adjoins the passage in the connector member to create a continuous passage through the connector members and the tube.

56. The drill pipe of claim 54 wherein:
   the inner member comprises a hose having first and second ends adapted to receive an extension member; and
   the extension member comprises a hose fitting and forms a passage which, when the extension member is assembled with the hose, adjoins the passage in the connector member to create a continuous passage through the connector member and the hose.

57. The drill pipe of claim 54 wherein:
   the inner member comprises a tube having first and second ends adapted to receive an extension member;
   the extension member comprises a pipe nipple having first and second threaded ends and forms a passage therethrough;
   the first and second connector members each define a threaded aperture correlative with the threaded ends of the pipe nipple;
   wherein when the pipe nipple is assembled with the tube and the connector member, the passage in the pipe nipple connects the passage through the connector member with the passage through the tube.

58. The drill pipe of claim 57 further comprising a support member forming a central aperture and receivable over the pipe nipple to support the pipe nipple within the outer member.

* * * * *